Figure 4:
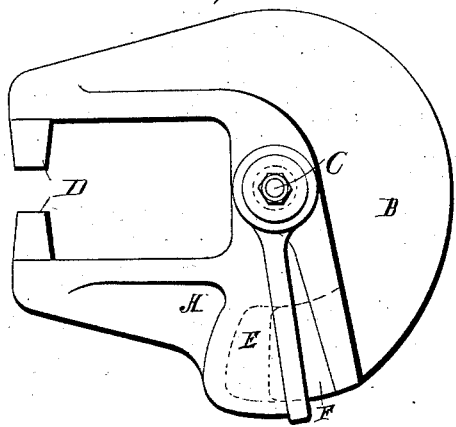

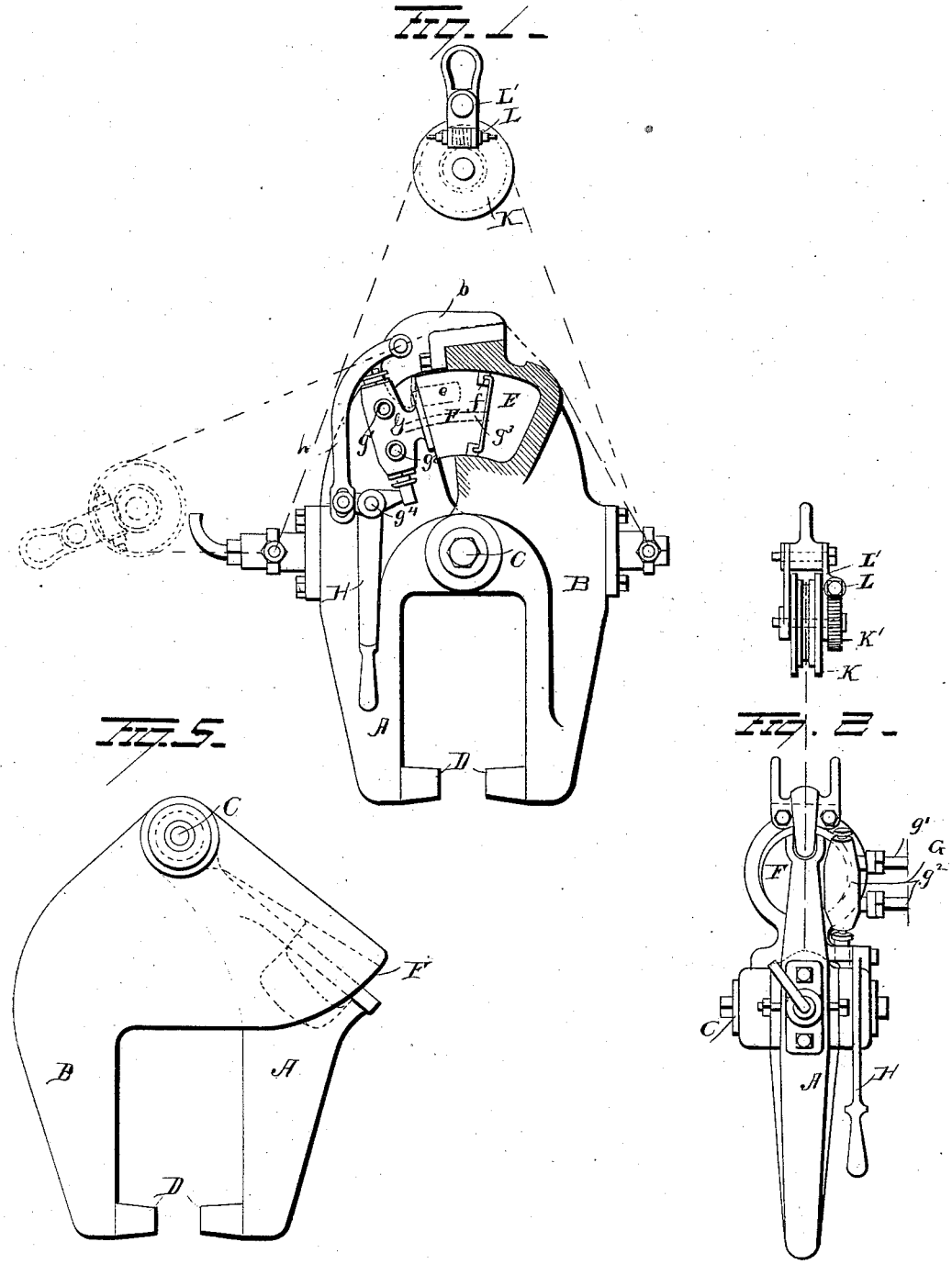

(No Model.) 5 Sheets—Sheet 2.
R. H. TWEDDELL, J. PLATT & J. FIELDING.
RIVETING MACHINE.
No. 307,358. Patented Oct. 28, 1884.
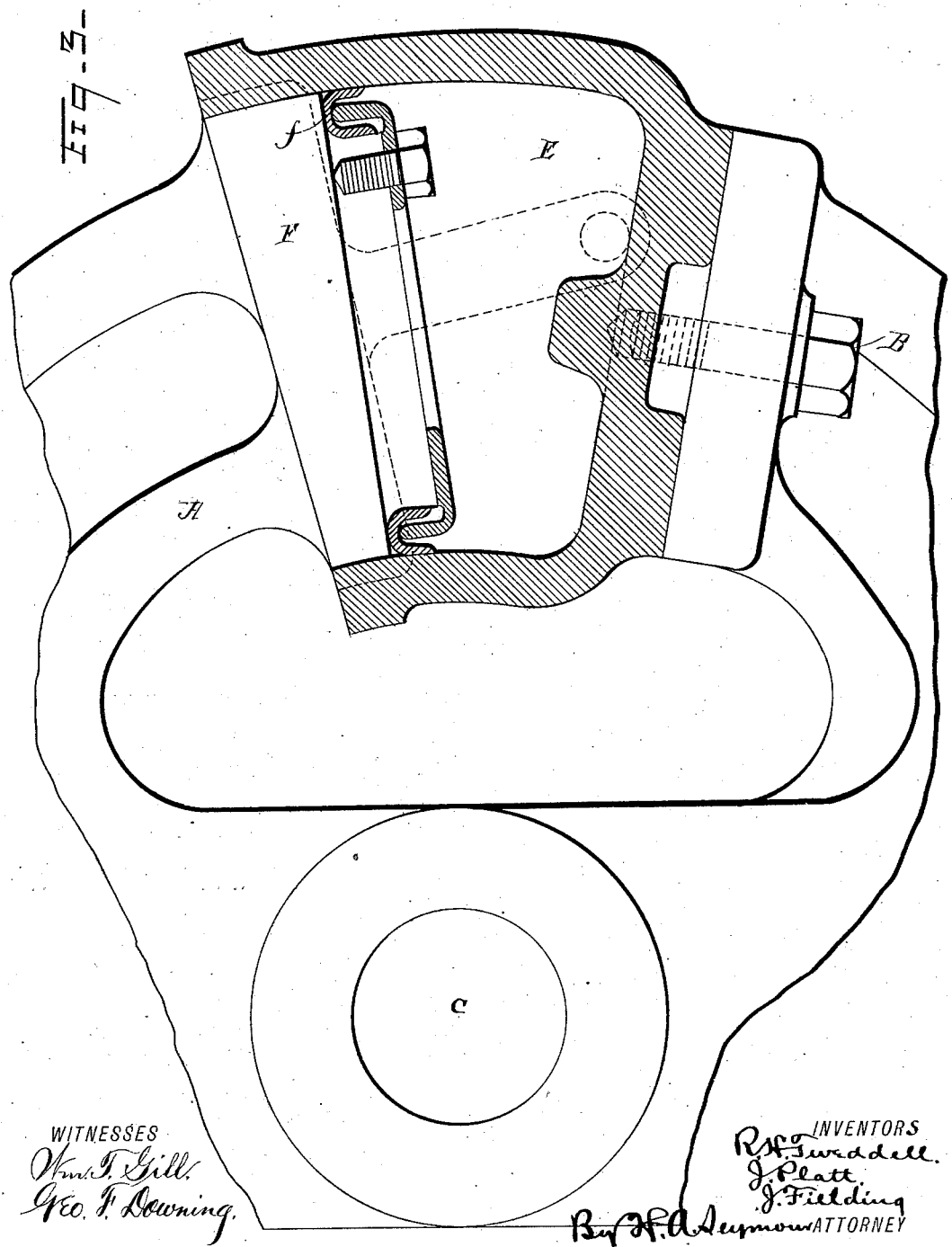

(No Model.) 5 Sheets—Sheet 3.

R. H. TWEDDELL, J. PLATT & J. FIELDING.
RIVETING MACHINE.

No. 307,358. Patented Oct. 28, 1884.

WITNESSES
Wm. T. Gill
Geo. F. Downing

INVENTOR
R. H. Tweddell
J. Platt
J. Fielding
ATTORNEY (No Model.) 5 Sheets—Sheet 4.
R. H. TWEDDELL, J. PLATT & J. FIELDING.
RIVETING MACHINE.

No. 307,358. Patented Oct. 28, 1884.

WITNESSES
Wm. T. Gill
Geo. F. Downing.

INVENTORS
R. H. Tweddell
J. Platt
J. Fielding
By H. A. Seymour ATTORNEY

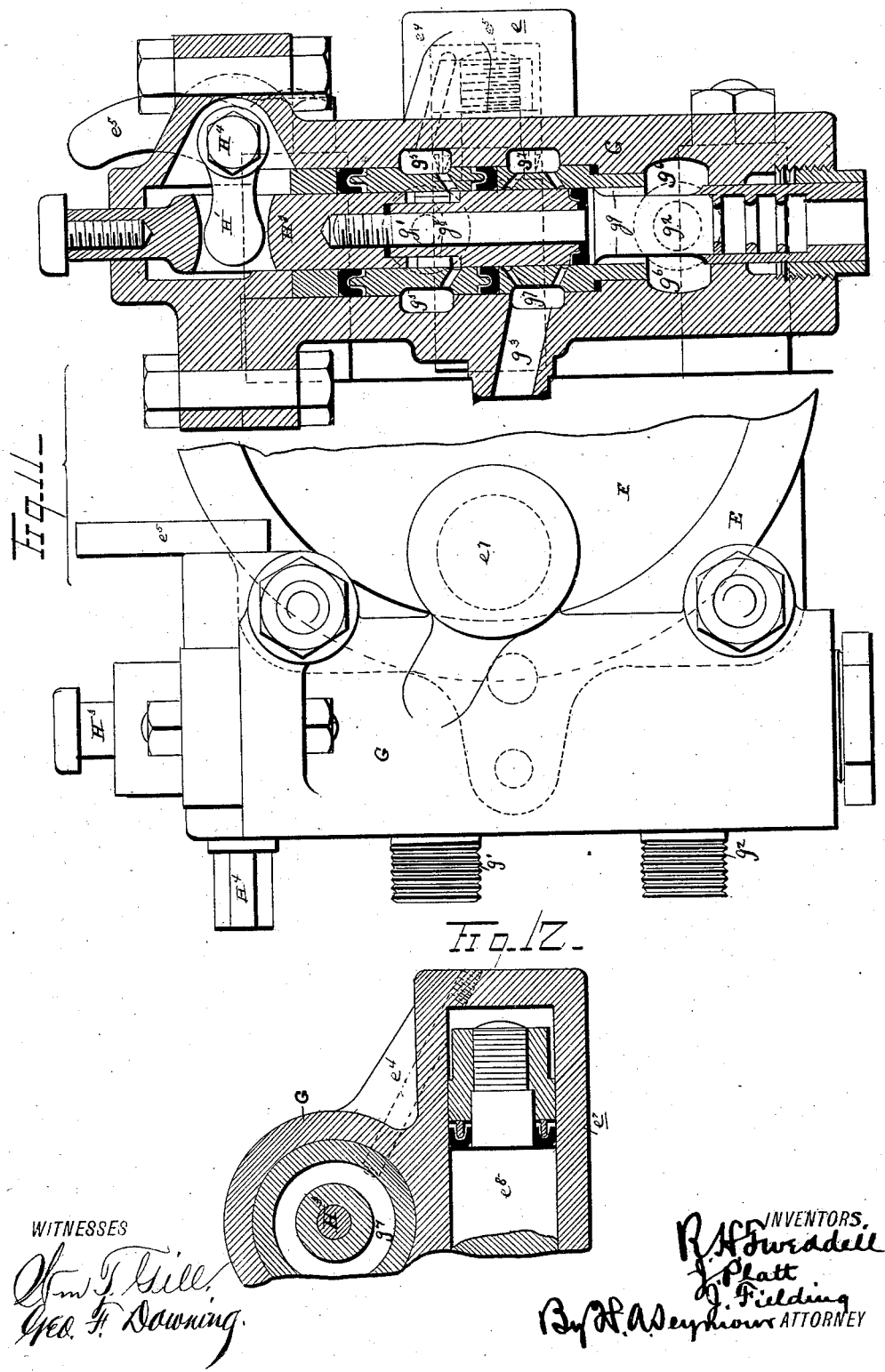

UNITED STATES PATENT OFFICE.

RALPH HART TWEDDELL, OF WESTMINSTER, COUNTY OF MIDDLESEX, AND JAMES PLATT AND JOHN FIELDING, OF GLOUCESTER, COUNTY OF GLOUCESTER, ENGLAND.

RIVETING-MACHINE.

SPECIFICATION forming part of Letters Patent No. 307,358, dated October 28, 1884.

Application filed June 21, 1884. (No model.) Patented in England March 6, 1880, No. 981; in France May 12, 1880, No. 136,626; in Belgium May 12, 1880, No. 51,466, and in Germany May 30, 1880, No. 11,725.

*To all whom it may concern:*

Be it known that we, RALPH HART TWEDDELL, of Westminster, in the county of Middlesex, and JAMES PLATT and JOHN FIELDING, of Gloucester, in the county of Gloucester, and country of England, have invented certain new and useful Improvements in Machines for Riveting; and we do hereby declare the following to be a full, clear, and exact description of the invention, such as will enable others skilled in the art to which it appertains to make and use the same.

Our invention relates to machines in which the pressure of water, air, steam, or other fluid acts on a piston or plunger so as to move jaws carrying metal-working tools, the objects which we have in view being to secure simplicity, steadiness of action, and facility of application of such machines.

Hitherto when a pair of jaws carrying tools have been moved by fluid-pressure around one common center, or around two centers, joints have been interposed between the plunger and the arm on which its acts, so as to allow for the latter moving in a circular arc round its center of motion, while the plunger moved in a straight line, and such joints, besides adding complexity to the apparatus, rendered its action unsteady laterally, so that the tools on the jaws did not come in proper line to their work. Now, according to our invention, we bore out the cylinder and turn the plunger which works in it to the shape of a portion of a ring having its axial line a circular arc struck from the center round which the arm moves. The cylinder thus bored being fixed rigidly on one arm of the jaws, while the plunger is fixed rigidly on the other arm, no intermediate connections are required, and there is no movement of the plunger relatively to the jaw, such as is apt to result from the looseness or wear of the intermediate joints. Those portions of the jaw-arms which carry the cylinder and the plunger may either be in line with the portions which carry the tools, or they may be at any convenient angle thereto, the arms being in that case in the form of bent levers.

In the accompanying drawings, Figure 1 is a view in side elevation, partly in section, of one form of machine. Fig. 2 is an end view of the same. Fig. 3 is an enlarged sectional view of the plunger and cylinder. Figs. 4, 5, 6, 7, 8, 9, 10, 11, and 12 are views of modified structures.

A and B are two lever-arms working on the center pin, C, and having the riveting or other tools fixed to their ends at D. The lever B is extended beyond the center, and is widened out in cylindrical form, and provided with a cavity, E, which is a portion of a circular ring having as its axis a circular arc struck from the center C. The lever A is also extended beyond the axis C, and has projecting from it, but in one piece with it or firmly attached to it, a plunger, F, which is shaped to fit the cavity E, and is provided with cup-leather packing $f$, so as to work tightly therein as a piston or plunger in a cylinder. When steam, water, or other fluid under pressure is admitted to the cavity E, it causes movement of the levers A and B round the center C, so as to bring the tools D forcibly together. These tools may be such as are suited for riveting, or they may be for punching, shearing, pressing, or any similar operation. When the pressure in E is relieved, the tools D can be separated. There are in lever-machines thus worked by fluid-pressure many known arrangements of valves for admitting the fluid to their cylinders and emitting it therefrom; also for effecting the back-stroke of their plungers when the pressure on them is relieved. Any of these arrangements are applicable to a machine of the construction shown. We will, however, describe an arrangement which is represented on the drawings.

G is the valve-box having at its side inlet and outlet $g'$ $g^2$, to which, respectively, are connected the pipes for the supply and discharge of the working fluid. There is also a middle passage, $g^3$, leading through the plunger F into the cavity E, as shown in dotted lines in Fig. 1. Within the valve-box G there is a cylindrical valve or slide worked by a hand-lever, H, by which the passage $g^3$ can be brought into communication with the inlet $g'$ or the outlet $g^2$. The axis $g^4$ of the lever H may be connected by a slotted link, $h$, to a horn, $b$, of the lever B, so that as the stroke of the levers A B is approaching completion the slide, moved by the link $h$, automatically cuts off supply of fluid. For the purpose of effecting the back-stroke of the levers the horn $b$ bears on the end of a plunger, $e$, (shown in dotted lines, Fig. 1,) which is fitted to work in a cylindrical cavity in the main plunger F. This cavity communicates by a small passage with the inlet of the valve, so that the pressure on the plunger $e$ causes the return of the plunger F into the cavity E.

The machine may be suspended in various attitudes, as indicated on Fig. 1, to suit the work to which it is applied—as, for example, for riveting the plates of a vessel or of an iron bridge. A convenient mode of suspension is by a chain passing over a pulley, K, which can be turned round and held in any desired position by worm-gearing L. This chain is connected at its opposite ends to the riveting-machine, and passes over the pulley K, which latter is constructed to prevent the chain from slipping thereon. The pulley-arbor is provided with a worm-wheel, K', with which the worm L, journaled in the box L', engages. By turning the worm L the chain will be moved thereon and the riveter turned to either side until its riveting-tools rest in a vertical position.

The machine may be made of large dimensions and fixed as a stationary machine in an inverted position. The cavity E being formed in one of the levers, and the plunger F, which works in it, being of one piece with the other lever or rigidly attached thereto, there are no loose connections of the parts such as admit of unsteadiness of action and are subject to slackness and wear; and obviously these parts, instead of being arranged on arms of the levers extended directly back from the center C, could be arranged on arms in various positions, as in Figs. 5, 6, 7, and 8 of the accompanying drawings. Thus in the form shown at Figs. 4 and 5 the lever B is bent nearly to a right angle, having its plunger F entering the cavity E, which is formed in the lever A.

Figure 6:
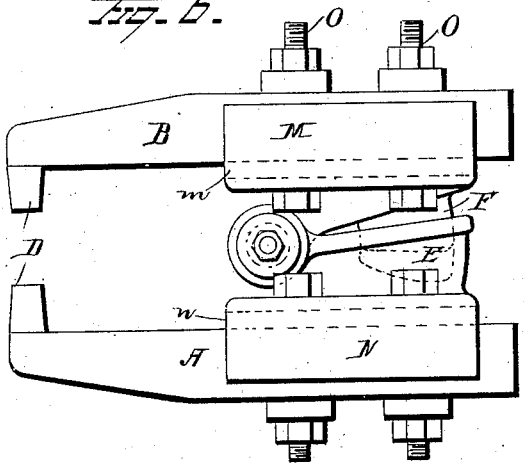

In Fig. 6 the lever-arms A B are fitted to slide in guides M N, so that they can be more or less extended in length. The space between them may also be made greater or less by introducing packing-pieces $m$ $n$ in the guides under them. When the lever-arms are adjusted as required, they are secured by bolts and nuts O.

Figure 7:
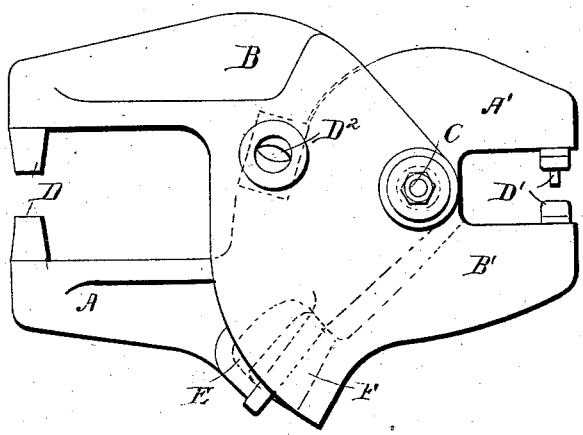

Fig. 7 shows an arrangement according to which the lever-arms A and B are made with extensions A' and B' beyond the center C, so as to hold punching or other tools, D'. Tools for shearing or straightening bars or rivets may also be arranged, as at D².

The machines described above are of a portable kind. A similar construction is applicable also to stationary machines, as illustrated by Fig. 8.

Figure 8:
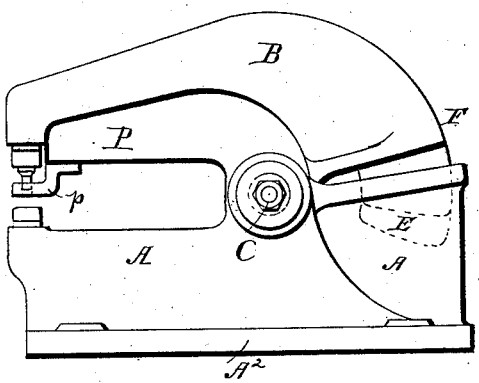
Figure 9:
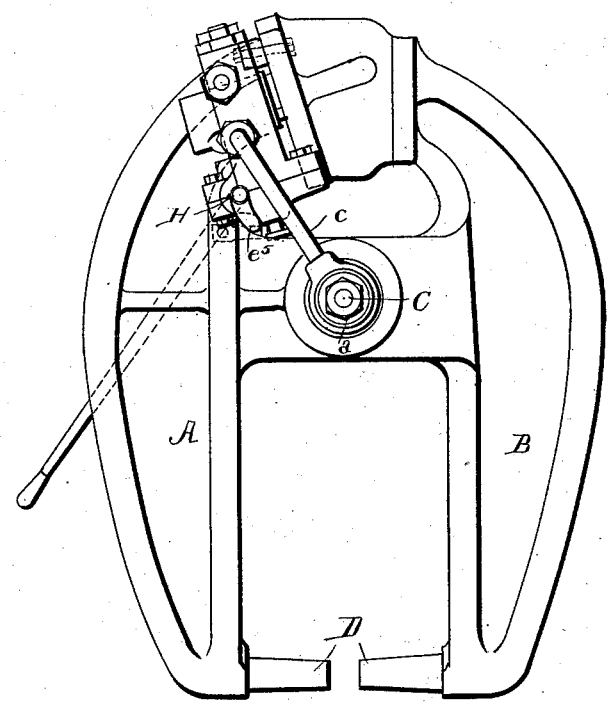
Figure 10:
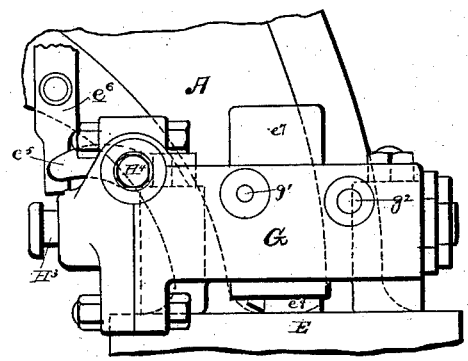

In the machine shown at Fig. 8, as adapted for punching, the lever A is made with a base, A², to rest in a horizontal position on the ground or on a foundation, the lever B being alone movable. A stationary horn, P, forming part of A, carries the guard $p$ for releasing the punch from the plate, and serves as a guide for the lever B.

Instead of fixing the cylinder on one arm and the plunger on the other, there may be between the arms, and connected to their fulcrum, a stationary cylinder having plungers protruded from it both ways—one plunger on each arm; or there may be a stationary plunger between the arms, with a cylinder on each arm working on the two ends of the stationary plunger.

In Fig. 1 we have shown the valve and valve-regulating devices attached to the plunger, while in Figs. 9, 10, 11, and 12 we have shown an arrangement of parts wherein the valve is attached to and moves with the cylinder. In this device water is supplied to the valve by a pipe, $c$, which connects with the hollow trunnion C. The valve-cylinder is provided with the supply and discharge openings before described, and is operated by the lever H, which latter is provided with the arm H', which rests in a slot in the piston H³ of the valve. This piston is provided with cup-leather packing and ports, which latter register with the supply and discharge openings. (Shown in dotted lines, Fig. 11.) Around these openings are formed chambers $g^5$ $g^6$. The upper one, $g^5$, is thrown in communication with the central opening, $g^7$, by the port $g^8$. Thus it will be seen that when the piston is depressed, the upper end of the port $g^8$ registers with the port of the chamber $g^5$, while the lower end of the port $g^8$ registers with the upper ports of the chamber $g^7$, thereby permitting the fluid to flow freely from the supply to the cylinder, and by elevating the piston until the lower ports of the chamber $g^7$ extend slightly below the cut-away portion $g^9$ of the plunger H³, the water in the cylinder is free to flow out through the discharge $g^2$. The small draw-back cylinder $e^7$ is attached to the valve-casing at right angles thereto, and is in constant communication with the supply $g'$ by the port $e^4$. The drawback-plunger $e^8$ bears on the outer side of the plunger F and forces the latter into the cylinder E.

The lever H or the shaft H⁴, to which the lever is attached, is provided with the horn $e^5$, which latter abuts against a stop, $e^6$, rigidly secured to the lever A. Thus it will be seen that as the lower free ends of the lever approach, the horn $e^5$ strikes the stop $e^6$ and moves the plunger H³ endwise, and opens the discharge and permits the fluid to pass from the cylinder E. As soon as the fluid begins to pass from the cylinder, the drawback-plunger forces the plunger into the cylinder E and the operation is again repeated.

Having fully described our invention, what we claim as new, and desire to secure by Letters Patent, is—

1. In a riveting-machine, the combination, with a lever provided at one end with a rigid cylinder and at its opposite end with a riveting-tool, of a second lever pivoted to the first-named lever, and provided at one end with a piston rigidly secured thereto, and at its opposite end with a riveting-tool, said piston and riveting-tool registering, respectively, with the cylinder and riveting-tool of the first-mentioned lever.

2. In a riveting-machine, the combination, with a lever, a cylinder rigidly secured to or formed integral with said lever, and a riveting-tool on the opposite end of said lever, of a second lever pivoted to the first-mentioned lever, a rigid plunger on one end of said lever, and a riveting-tool on the opposite end thereof, the said cylinder and plunger having their axes in a circular arc struck from the pivotal point of the levers, substantially as set forth.

3. The combination, with the lever B, having a cylinder rigidly secured thereto, and the lever A, having a plunger secured thereto, the said cylinder and plunger having their axes in a circular arc struck from the pivotal point of the levers, of a valve for regulating the admission and discharge of the operating fluid, substantially as set forth.

4. In a riveting-machine, the combination, with riveting-tools operated by a plunger moving within a cylinder, of a valve for regulating the admission and discharge of working fluid to the cylinder, and a lever operated automatically for cutting off the supply of actuating fluid, substantially as set forth.

5. In a hydraulic riveting-machine, the combination, with suitable levers, of a cylinder, a plunger adapted to move therein, a slide-valve, and a lever operated by the movement of the plunger, substantially as set forth.

6. In a hydraulic riveting-machine, the combination of riveting-levers, a cylinder, a plunger working in the cylinder, a valve-casing provided with a port communicating with the cylinder, a slide-valve, a lever adapted to automatically shut off the supply to the cylinder, and a hand-lever for moving the valve, substantially as set forth.

7. The combination, with two levers pivoted together, one of said levers being provided at one end with a cylinder and at its opposite end with a riveting-tool, and the other lever provided at one end with a plunger and its opposite end with a riveting-tool, of a pushback plunger operating against the above-mentioned plunger for moving the latter into the cylinder, substantially as set forth.

In testimony whereof I have signed this specification in the presence of two subscribing witnesses.

RALPH HART TWEDDELL.

Witnesses:
  H. G. SCOTT,
  WM. BAILEY.

In testimony whereof we have signed this specification in the presence of two subscribing witnesses.

JAMES PLATT.
JOHN FIELDING.

Witnesses:
  JOHN A. POPE,
  H. CADENNE.